(12) United States Patent
Engineer

(10) Patent No.: US 11,473,551 B1
(45) Date of Patent: Oct. 18, 2022

(54) FLEXIBLE IGNITION DEVICE FOR GASOLINE COMPRESSION IGNITION COMBUSTION IN INTERNAL COMBUSTION ENGINES

(71) Applicant: SAUDI ARABIAN OIL COMPANY, Dhahran (SA)

(72) Inventor: Nayan Engineer, Canton, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/462,662

(22) Filed: Aug. 31, 2021

(51) Int. Cl.
  *F02P 23/04* (2006.01)
  *F02B 9/02* (2006.01)

(52) U.S. Cl.
  CPC .............. *F02P 23/04* (2013.01); *F02B 9/02* (2013.01)

(58) Field of Classification Search
  CPC ................................ F02P 23/04; F02B 9/02
  USPC ........................................................ 123/43 B
  See application file for complete search history.

(56) References Cited

U.S. PATENT DOCUMENTS

| | | | |
|---|---|---|---|
| 3,665,902 A | 5/1972 | Bloomfield | |
| 6,994,073 B2 | 2/2006 | Tozzi et al. | |
| 7,021,275 B2 | 4/2006 | Durling | |
| 7,082,920 B2 | 8/2006 | Robinet et al. | |
| 7,392,795 B2 | 7/2008 | Nagamine et al. | |
| 9,932,883 B2 | 4/2018 | Iwai et al. | |
| 9,970,407 B2 | 5/2018 | Idicheria et al. | |
| 10,886,706 B2 | 1/2021 | Zhou | |
| 2008/0098984 A1* | 5/2008 | Sakamaki | F02M 51/005 123/297 |
| 2013/0180498 A1 | 7/2013 | Rabhi | |

FOREIGN PATENT DOCUMENTS

| | | |
|---|---|---|
| CN | 112240239 A | 1/2021 |
| JP | 2011-99403 A | 5/2011 |
| JP | 2011-99404 A | 5/2011 |
| WO | 2013/117857 A2 | 8/2013 |
| WO | 2015/138987 A1 | 9/2015 |
| WO | 2019/141728 A1 | 7/2019 |

* cited by examiner

*Primary Examiner* — Hai H Huynh
(74) *Attorney, Agent, or Firm* — Osha Bergman Watanabe & Burton LLP

(57) ABSTRACT

This disclosure presents, in one or more embodiments, an ignition device for a gasoline compression ignition engine. The ignition device includes a shuttle plunger with a gas chamber. The gas chamber is delimited by at least one sidewall of the shuttle plunger and captures exhaust gases. The ignition device also includes an electromagnetic coil that actuates the shuttle plunger in a first direction, a main body with a cavity containing the shuttle plunger and the electromagnetic coil, and a center electrode, fixed to the shuttle plunger, that ignites a fuel mixture.

19 Claims, 5 Drawing Sheets

FLEXIBLE IGNITION DEVICE FOR GASOLINE COMPRESSION IGNITION COMBUSTION IN INTERNAL COMBUSTION ENGINES

BACKGROUND

Gasoline compression ignition (GCI) is a method of gasoline ignition for an internal combustion engine that relies on compressing a mixture of fuel and air in a piston cylinder, resulting in the self-ignition of the fuel and air mixture. Due to the inherent reliance on the air temperature after the air is compressed, under cold start conditions GCI combustion engines may require a combustion aid to increase the combustion chamber temperature prior to combustion. This combustion aid may come in the form of a block heater, glow plug, or other warming devices.

Ignition devices may also be used as a combustion aid during cold start conditions of compression ignition engines. A common ignition device set up requires a continuous ignition source, or spark, to be produced such that combustion is created by sparking an air and fuel mixture in the combustion chamber of the engine. Conventionally, the spark is created by energizing a copper ignition rod and placing the energized ignition rod within a set distance to a grounded nickel or iridium plate. The electrical difference between the energized ignition rod and the grounded plate creates a continuous spark, which then ignites the air and fuel mixture. Alternatively, a portion of the air and fuel mixture may be ignited in a precombustion chamber, which spreads into the main combustion chamber to ignite the remainder of the air and fuel mixture.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in one or more embodiments, an ignition device for a gasoline compression ignition engine. The ignition device includes a shuttle plunger with a gas chamber. The gas chamber is delimited by at least one sidewall of the shuttle plunger and captures exhaust gases. The ignition device also includes an electromagnetic coil that actuates the shuttle plunger in a first direction, a main body with a cavity containing the shuttle plunger and the electromagnetic coil, and a center electrode, fixed to the shuttle plunger, that ignites a fuel mixture.

A method of operating a gasoline compression ignition engine includes combusting, by a center electrode fixed to a shuttle plunger of an ignition device, a first air and fuel mixture in a main chamber of the gasoline compression ignition engine, thereby producing exhaust gases. The method also includes extending, by an electromagnetic coil, the shuttle plunger from a cavity of a main body of the ignition device that contains the shuttle plunger and capturing the exhaust gases by a gas chamber of the shuttle plunger. The gas chamber is delimited by at least one sidewall of the shuttle plunger. The method further includes withdrawing the shuttle plunger into the main body to seal the gas chamber and intaking a second air and fuel mixture into the main chamber of the gasoline compression ignition engine. Finally, the method includes compressing the second air and fuel mixture and extending, by the electromagnetic coil, the shuttle plunger from the cavity of the main body to release the exhaust gases from the gas chamber.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the embodiments disclosed herein are described with respect to a limited number of embodiments, those skilled in the art, having benefit of this disclosure, will appreciate that other embodiments may be devised which do not depart from the spirit of the invention as disclosed herein. Accordingly, the scope of the invention should be limited only by the attached claims.

In general, embodiments disclosed herein provide a method, system, and apparatus for facilitating a combustion reaction within a combustion chamber of a gasoline compression ignition engine. The combustion reaction is facilitated by an ignition device which allows the engine to be operated in either a compression combustion process or a spark-ignited combustion process. Specifically, the ignition device incorporates a spark-ignited ignition source and a gas chamber for capturing exhaust gases, both of which aid in facilitating the combustion reaction. The ignition device may be part of a larger ignition system with a fuel injector that injects fuel into a combustion chamber, an exhaust system for removing combusted air and fuel gases, a turbocharging system that injects compressed air into the combustion chamber, or any combination thereof.

Figure 1:
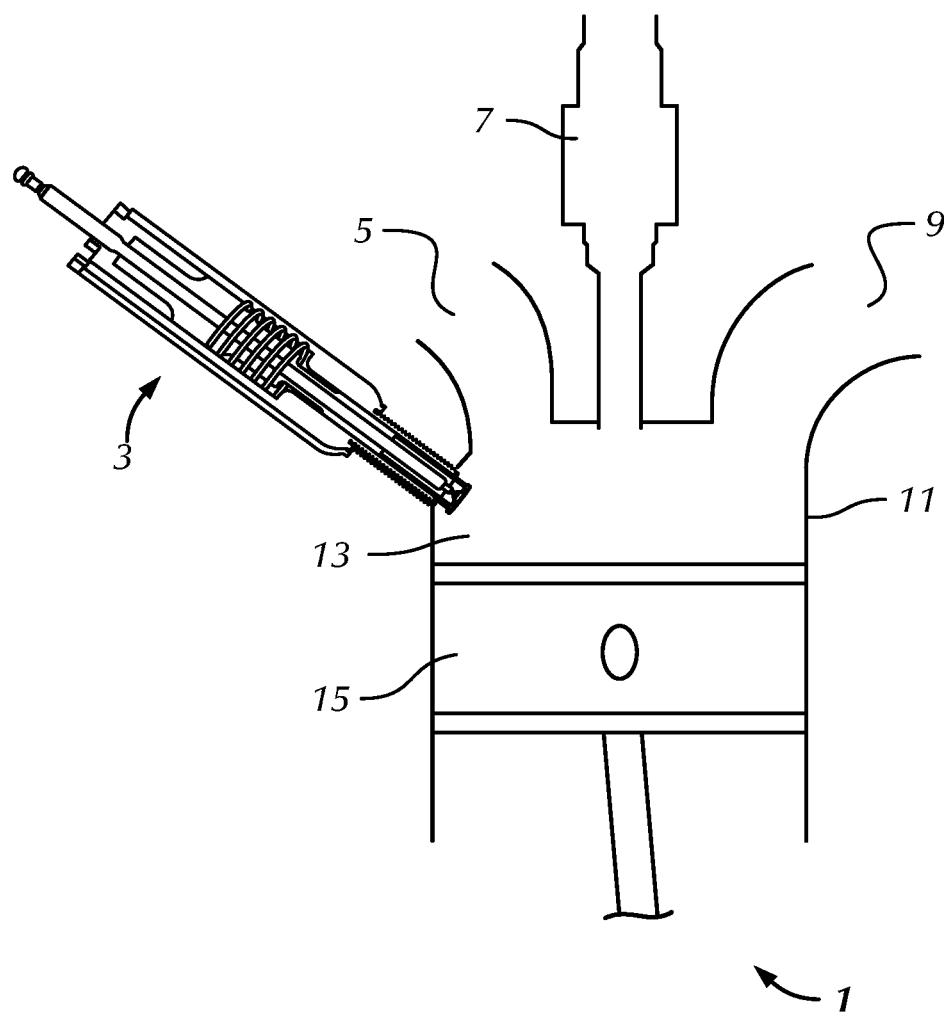
FIG. 1 shows an engine in accordance with one or more embodiments.

FIG. 1 shows an engine assembly including an engine 1 and an ignition device 3 in accordance with one or more embodiments. The engine is a GCI engine as described above. The engine 1 may operate in different modes including a spark ignition mode, a compression ignition mode, or a hybrid mode, each of which are described below.

As shown in FIG. 1, the engine 1 includes a cylinder head 11, formed of aluminum or cast iron, that delimits the combustion chamber 13 in conjunction with the piston 15. In addition, the cylinder head 11 provides support for attaching various components that fluidly communicate with the combustion chamber 13. Specifically, the ignition device 3, intake manifold 5, injector 7, exhaust manifold 9, and injector 7 are disposed in or on the cylinder head 11 such that these devices fluidly communicate with the combustion chamber 13.

The intake manifold 5 and exhaust manifold 9 are configured to facilitate the introduction and removal of gases from the combustion chamber 13. In particular, the intake manifold 5 is configured to allow air and fuel to enter the combustion chamber 13 prior to the combustion reaction. Conversely, the exhaust manifold 9 is configured to allow air and fuel to exit the combustion chamber 13 following the combustion reaction. The intake manifold 5 and exhaust manifold 9 are formed of cast iron or aluminum, and are bolted, welded, or otherwise rigidly fixed to the cylinder head 11.

The injector 7 is formed of metal such as carburized steel or titanium and is configured to inject fuel through a fuel nozzle (not shown) into the combustion chamber 13 according to signals from an Engine Control Unit (not shown), or ECU. The injected fuel is then mixed with air from the intake manifold 5 to create a combustible mixture.

As described below, the ignition device 3 is formed from a plurality of components and materials, and aids in the combustion reaction of the combustible mixture by increasing the temperature of the combustible mixture. This combustible mixture is then ignited to actuate the piston 15, therefore expanding the combustion chamber 13 and generating work.

In order to create a spark ignited combustion reaction in the spark ignition mode, the engine 1 operates in a process including an intake phase, a compression phase, a combustion phase, a power phase, and an exhaust phase. Initially, during the intake phase of an engine cycle a piston 15 of the engine 1 is actuated. The resulting vacuum created by the piston 15 draws air into the combustion chamber 13 from the intake manifold 5, while fuel is simultaneously injected through the fuel injector 7. The intermixing of the air and fuel creates a first air and fuel mixture to be ignited during the combustion phase.

During the compression phase, the piston 15 reaches its lowest point (hereinafter "BDC" or bottom dead center) and the piston 15 actuates to compress the air and fuel mixture in the combustion chamber 13. In the combustion phase, the piston 15 reaches its highest point (hereinafter "TDC" or top dead center), and the ignition device 3 creates a spark that ignites the compressed air and fuel mixture. During the power phase the expansion of the air and fuel mixture throughout the combustion chamber 13 thrusts the piston 15 downward and creates work that is translated to an output shaft (not shown) of the engine 1. During the exhaust phase, the piston 15 actuates from BDC to TDC, forcing the exhaust gases out of the exhaust manifold 9. At this point, the piston 15 is at TDC and the cycle restarts with the intake phase.

The engine 1 may also run in a compression ignition mode aided by the ignition device 3. In this case, the cycle begins with the intake phase by opening the intake manifold 5. The piston 15 actuates from TDC to BDC, thereby pulling air into the combustion chamber 13. During the compression phase the piston 15 compresses the air in the combustion chamber 13. Fuel is then injected through the fuel injector 7, which self-ignites upon contact with the hot compressed air. During the power phase, the combusted air and fuel expands, forcing the piston 15 to BDC and generating work. In the exhaust phase, the piston 15 is actuated and the exhaust gases are forced from the combustion chamber 13 into the ignition device 3 and the exhaust manifold 9. When the piston 15 is at TDC, the ignition device 3 is closed and the cycle restarts. However, during the end of the subsequent compression phase and the beginning of the subsequent combustion phase the hot exhaust gases are released into the combustion chamber 13. The hot exhaust gases raise the temperature of the combustion chamber 13, which aids in the self-ignition of a second air and fuel mixture formed during the second intake phase of the engine.

The engine 1 may further run in a hybrid mode in which both a spark ignition mode and compression ignition mode are used sequentially. In such cases, the first engine cycle is run in a spark ignition mode, but the ignition device 3 is actuated during the exhaust phase in order to capture the exhaust gases. Once the first engine cycle is complete, the engine 1 switches to a compression ignition mode, and the hot exhaust gases captured during the spark ignition reaction are released in the combustion chamber 13 following the compression phase of the compression ignition cycle. If the engine has not reached a requisite temperature to operate in a compression ignition cycle without the use of the spark created by the ignition device 3, the ignition device 3 extends during the subsequent power phases to create a spark. This process continues until the engine 1 operates in a compression mode without the spark generated by the ignition device 3, or until the engine reaches a required load or efficiency metric.

Accordingly, the use of an ignition device 3 according to one or more embodiments of the invention allows the engine 1 to operate efficiently in multiple modes according to a variety of factors such as external temperature, fuel consumption, or thermal efficiency.

Figure 2:
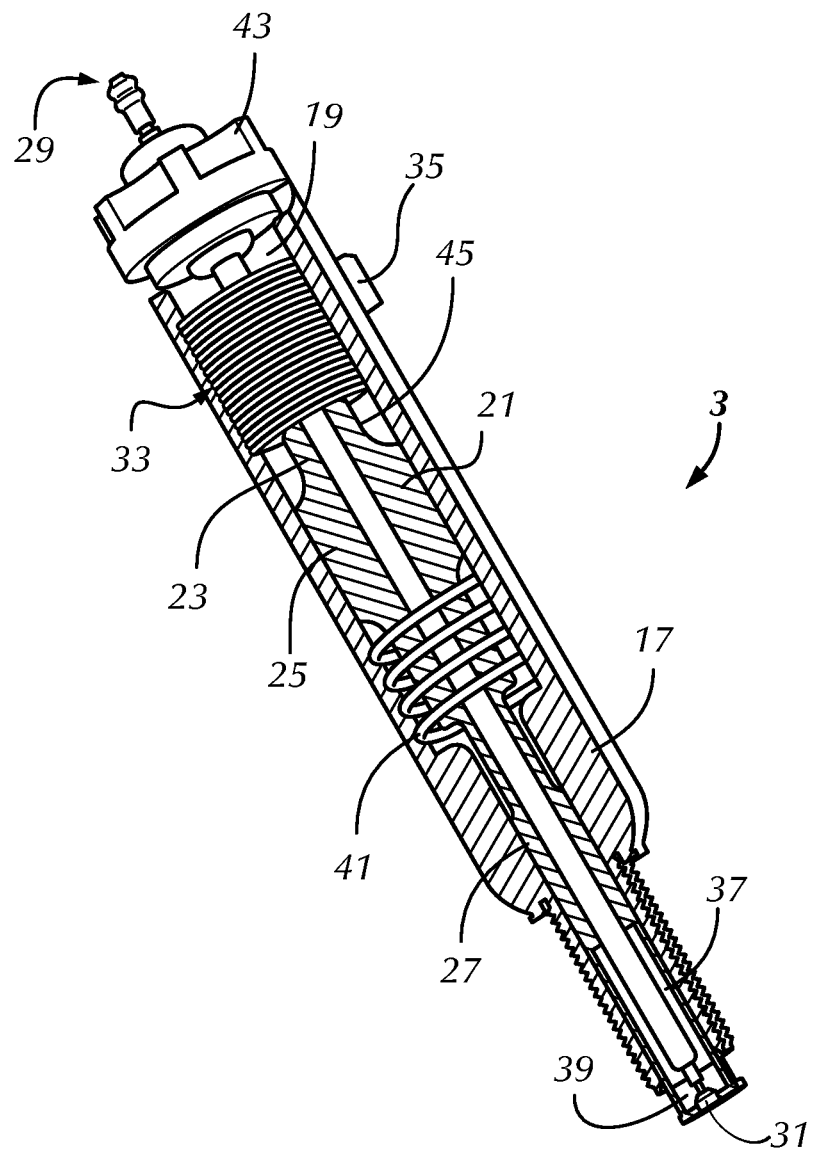
FIG. 2 shows an apparatus in accordance with one or more embodiments.

FIG. 2 shows an ignition device 3 in accordance with one or more embodiments that is attached to a cylinder head 11 of the GCI engine assembly depicted in FIG. 1. The ignition device 3 has a main body 17 with a cavity 19 containing a shuttle plunger 21, a gas chamber 37, a center electrode 29, a ground electrode 31, an electromagnetic coil 33, and a return spring 41. The main body 17 has an elongate form, and the end of the main body 17 containing the ground electrode 31 is threaded into the cylinder head 11 such that the main body 17 protrudes into the combustion chamber 13. In the embodiment shown in FIG. 2, the thread pattern of a threaded end of the main body 17, which contains the ground electrode 31, is matched to a 14 mm threaded hole in the cylinder head 11 of the engine 1. In order to facilitate threading the main body 17 into the cylinder head 11, the main body 17 may also have a drive lug (not shown) formed as a slot in the main body 17, which aids in applying torque to the main body 17 from a tool such as a screwdriver or wrench.

The shuttle plunger 21 is configured to extend in a first direction from a first position in which the shuttle plunger 21 is contained entirely inside of the cavity 19 of the main body 17 to a second position in which the shuttle plunger 21 extends outside of the main body 17. To assist in the extension and withdrawal of the shuttle plunger 21, the inner surface of the main body 17 is formed from an oil impregnated material such as oil impregnated bronze, iron, or a porous alloy. As shown, the shuttle plunger 21 is flush with an inner surface of the main body 17 such that the exhaust gas produced in the combustion chamber 13 cannot escape the main body 17. Alternatively, the shuttle plunger 21 may also be sealed by one or more gaskets or O-rings between the shuttle plunger 21 and main body 17.

In one or more embodiments, the shuttle plunger 21 has three sections: an upper section 23, a middle section 25, and a lower section 27. Each of the upper section 23, middle section 25, and lower section 27 are rigidly fixed to the center electrode 29 and are formed of a material such as a steel alloy, martensitic stainless steel, porcelain, ceramic, or equivalent. The lower section 27 delimits the gas chamber 37 such that the shuttle plunger 21 contains the gas chamber 37. In addition, the lower section 27 contains the return spring 41 and the ground electrode 31, while the upper section 23 contains the electromagnetic coil 33. In one or more embodiments, the middle section 25 abuts against the inner surface of the main body 17 and has a larger cross section than the upper section 23 and lower section 27. This larger cross section of the middle section 25 is flush with the main body 17, which allows the electromagnetic coil 33 to be separated from the spark created by the center electrode 29 and ground electrode 31. In addition, the larger cross section of the middle section 25 ensures that the exhaust gases trapped within the gas chamber 37 cannot escape the ignition device 3.

To actuate the shuttle plunger 21, the outer surface of the upper section 23 is coated or impregnated with a rigidly fixed layer of magnetic material such as alumina, ferrous or non-ferrous alloy, cobalt, or other equivalent material. This magnetic material forms an electromagnetic sleeve 45 that allows the shuttle plunger 21 to be actuated by the electromagnetic coil 33. Alternatively, the electromagnetic sleeve 45 may be created by an oxidation of the material which forms the shuttle plunger 21, which causes thermal barrier (e.g., a layer of alumina) to form on the exterior of the shuttle plunger 21. In addition, the magnetic material may be applied to the outer surface of the upper section 23 through a thermal spraying or plasma spraying process, forming a thermal barrier coating. Further, if the shuttle plunger 21 is formed of a magnetic material, the upper section 23 may not include an electromagnetic sleeve 45, in which case the electromagnetic coil 33 applies a magnetic force directly to the upper section 23.

In one or more embodiments, the electromagnetic coil 33 surrounds the shuttle plunger 21 and interfaces with the electromagnetic sleeve 45 to form a solenoid. When a current is applied to the electromagnetic coil 33, an electromagnetic field is created that surrounds the electromagnetic sleeve 45 and causes the actuation of the shuttle plunger 21. In order to control the current applied to the electromagnetic coil 33, the electromagnetic coil 33 is connected to an ECU (not shown) of the engine 1 through an electromagnetic coil connector body 35 that extends from the cavity 19 of the main body 17 to an external surface of the main body 17. The electromagnetic coil connector body 35 is embodied as either a plug or socket of a plug and socket connector. In either case, a wire (not shown) connects the electromagnetic coil connector body 35 to the ECU (not shown). This connection to the ECU (not shown) allows the ECU (not shown) to control the timing, duration, and strength of the applied current, thereby enabling the ECU (not shown) to control the actuation of the shuttle plunger 21.

In one or more embodiments of the invention as disclosed, the shuttle plunger 21 is actuated once per engine cycle irrespective of the engine operating conditions. However, the shuttle plunger 21 may also be actuated according to a multitude of engine operating metrics such as the engine temperature, the engine load, the intake and exhaust temperatures of the engine, or any combination thereof. For example, the shuttle plunger 21 may be actuated only once per multiple engine cycles when the engine load or engine temperature reaches a threshold value determined by the ECU (not shown). In this case, the shuttle plunger 21 remains extended from the main body 17 such that a spark is still created in the combustion chamber 13. Advantageously, this mode of operation allows the ignition device 3 to conserve the energy that would be spent by the electromagnetic coil 33 when capturing the exhaust gases is not desired. Alternatively, in one or more embodiments, the plunger actuates during each cycle at its predefined timing.

Due to the force applied to the shuttle plunger 21 by the electromagnetic field acting upon the electromagnetic sleeve 45, the shuttle plunger 21 is actuated. As shown, the shuttle plunger 21 moves in a first direction from a first position in which the shuttle plunger 21 is contained inside of the cavity 19 of the main body 17 to a second position in which the shuttle plunger 21 and gas chamber 37 extend from the main body 17. In addition, due to the return spring 41 surrounding the lower section 27 of the shuttle plunger 21, the return spring 41 is compressed between the middle section 25 of the shuttle plunger 21 and the main body 17. When the gas chamber 37 is extended from the main body 17, the gas chamber 37 is exposed to the combustion chamber 13 and captures exhaust gases from the combustion reaction through an orifice 39 in the shuttle plunger 21. As shown, the orifice 39 is a series of openings radially distributed in at least one sidewall of the shuttle plunger 21. Alternatively, the orifice 39 may be a single opening in the sidewall of the shuttle plunger 21.

After a predetermined period of time, current is no longer applied to the electromagnetic coil 33. At this point, the return spring 41 applies a force to the shuttle plunger 21 and gas chamber 37 in a second direction, opposite the first direction, back into the main body 17 of the ignition device 3. Once the gas chamber 37 has been withdrawn into the main body 17, the orifice 39 of the gas chamber 37 is sealed by the main body 17 and the gases are trapped within the gas chamber 37 until the shuttle plunger 21 is extended from the main body 17, which releases the gases from the gas chamber 37.

Alternatively, the shuttle plunger 21 may be mechanically operated by a cam and rocker arm. In this embodiment, a rocker arm is used to actuate the shuttle plunger 21 via a dedicated cam lobe on either the engine's intake or exhaust camshaft. Additionally, a dedicated camshaft could be fitted to the shuttle plunger 21 in order to synchronize the shuttle plunger 21 actuation with the rotation of the engine 1 camshafts.

In order to maintain the spark gap between the center electrode 29 and ground electrode 31, both the center electrode 29 and ground electrode 31 are rigidly fixed to the shuttle plunger 21. This allows for the spark gap to be maintained when the shuttle plunger 21 is actuated and ensures that the center electrode 29 and ground electrode 31 create a spark when exposed to the combustion chamber 13. In addition, in order to further ensure the continued generation of the spark, the inner surface of the shuttle plunger 21 is formed from a dielectric material such as alumina, porcelain, or a polymer composite that insulates the center electrode 29 from the electromagnetic coil 33.

To mitigate thermal damage to the shuttle plunger 21 from the exhaust gases, the gas chamber 37 is coated in a thermal barrier coating such as mullite, yttria-stabilized zirconia, or alumina. In the embodiment shown in FIG. 2, the gas chamber 37 is formed of the alumina which encases the center electrode 29.

Continuing with FIG. 2, the main body 17 has a cap 43 disposed at its distal end with the center electrode 29 extending axially through the cap 43. As shown, the cap 43 is threaded into the main body 17 to form a bump stop for the upper section 23 of the shuttle plunger 21 to abut against. This allows the shuttle plunger 21 to be mechanically retained within the main body 17 so that the electromagnetic coil 33 is not activated at all times, therefore saving the energy cost of constantly energizing the electrical coil. In addition, one or both sides of the cap 43 may have a sealing element such as a gasket or O-ring that prevents the exhaust gases from leaving the main body 17. In order to move the center electrode 29 through the cap 43, the distal end of the center electrode 29 is encased in an oil impregnated material so that the center electrode 29 moves with the shuttle plunger 21.

Figure 3:
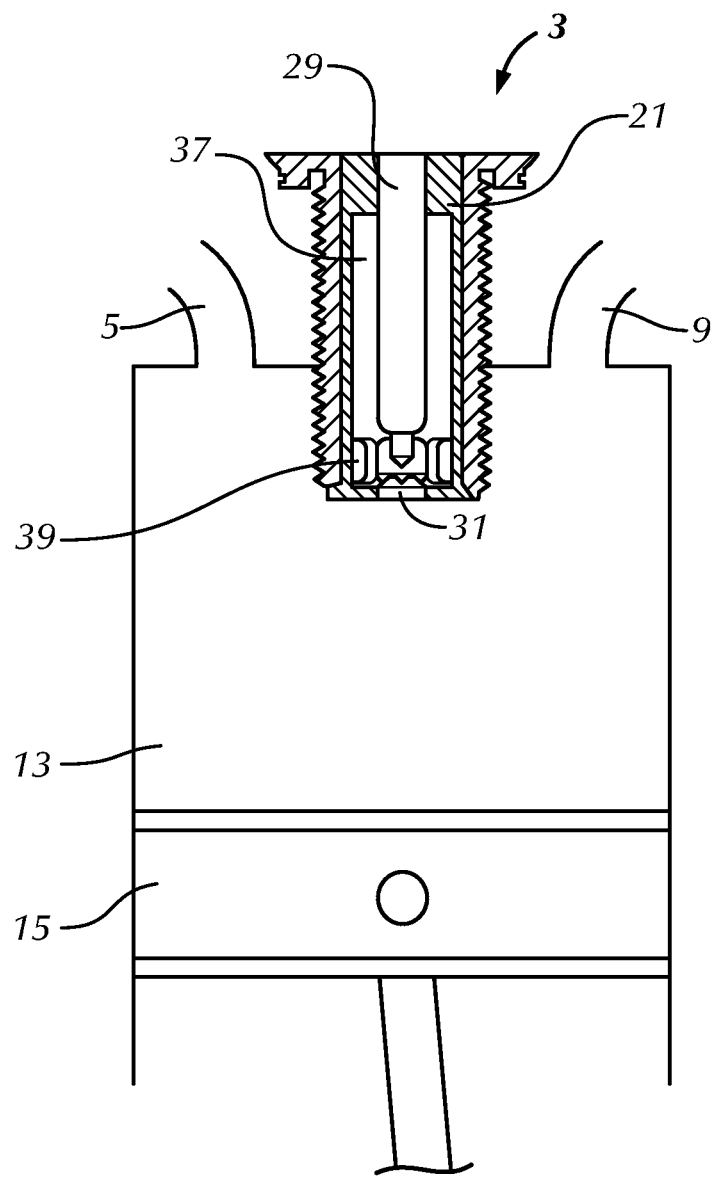
FIG. 3 shows an apparatus in accordance with one or more embodiments.
Figure 4:
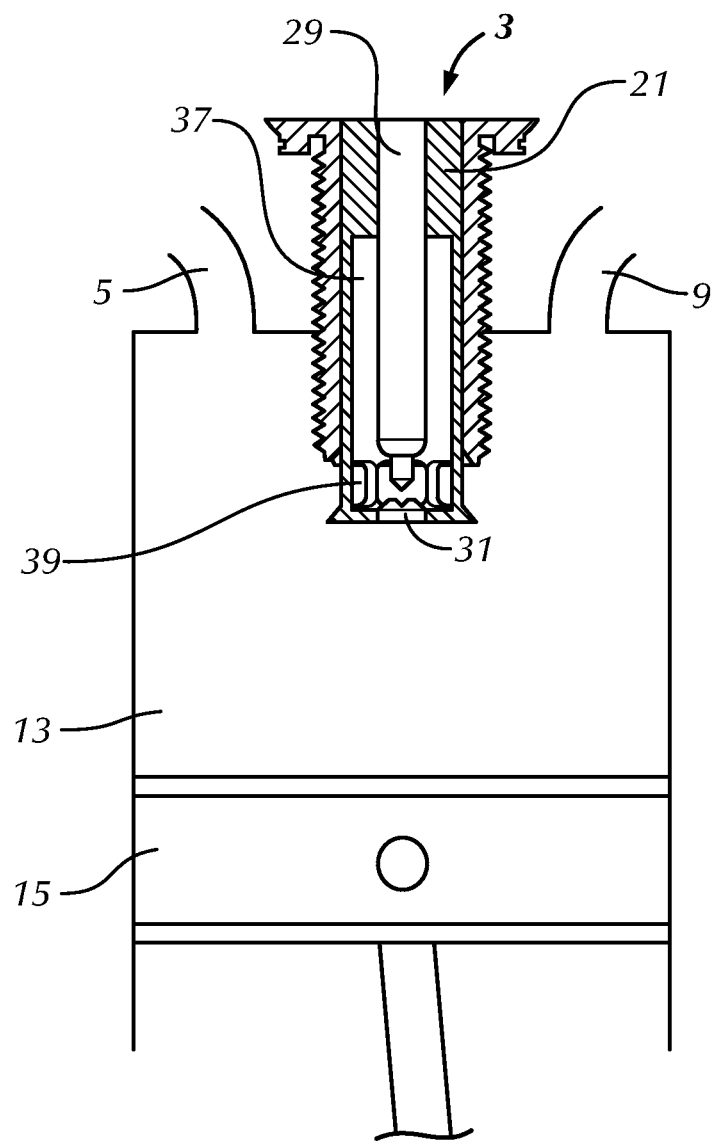
FIG. 4 shows an apparatus in accordance with one or more embodiments.

FIGS. 3 and 4 depict the shuttle plunger 21 in the first and second position, respectively. As seen in FIG. 3, in the first position the shuttle plunger 21 is withdrawn into the main body 17 and the gas chamber 37 is completely sealed from the combustion chamber 13 by the main body 17, ground electrode 31, and sidewalls of the shuttle plunger 21. As described above, the shuttle plunger 21 remains sealed within the main body 17 of the ignition device 3 throughout the intake and compression phases of the engine cycle. Alternatively, the shuttle plunger 21 remains extended into the combustion chamber 13 throughout each phase. In either case, because the gas chamber 37 is sealed from the combustion chamber 13 during the remainder of the exhaust phase, the exhaust gases retain their heat throughout these cycles and only a residual amount of heat is lost to the cylinder head 11. To seal the gas chamber 37 with the main body 17, the shuttle plunger 21 has a 45-degree beveled edge that is flush with the gas chamber 37. However, in order to reduce manufacturing costs, the shuttle plunger 21 may alternatively have a flat edge that is received flush with the main body 17.

Regardless of which phase the actuation of the shuttle plunger 21 occurs in, the electromagnetic coil 33 is energized by the ECU (not shown) to create an electromagnetic field that repels the electromagnetic sleeve 45 of the shuttle plunger 21. In the embodiment shown in FIG. 3, the shuttle plunger 21 is actuated when the piston 15 is approximately 50 degrees before BDC. However, the shuttle plunger 21 may advantageously be actuated at any period of time according to the engine 1 operating conditions and loads.

As shown in FIG. 4, the electromagnetic coil 33 is energized, the shuttle plunger 21 is in the second position and extends from the main body 17, and the gas chamber 37 is exposed to the compressed air and fuel mixture of the combustion chamber 13. Due to the diffusion of the hot exhaust gases from the gas chamber 37 to the combustion chamber 13, the temperature of the compressed air and fuel mixture increases and causes the auto-ignition of the compressed air and fuel mixture. The exposition of the exhaust gases through the orifice 39 has the added benefit of creating a large combustion front for the compressed air and fuel mixture, as the auto-ignition begins at multiple points in the orifice 39 simultaneously, rather than being localized at the spark.

After a predetermined period of time in which the exhaust gases escape the gas chamber 37, the electromagnetic coil 33 is de-energized and shuttle plunger 21 is actuated by the return spring 41 to the first position shown in FIG. 3. The total actuation distance of the shuttle plunger 21 is between 4 and 5 mm between the first position and second position so that the shuttle plunger 21 does not interfere with the operation of the piston 15.

Figure 5:
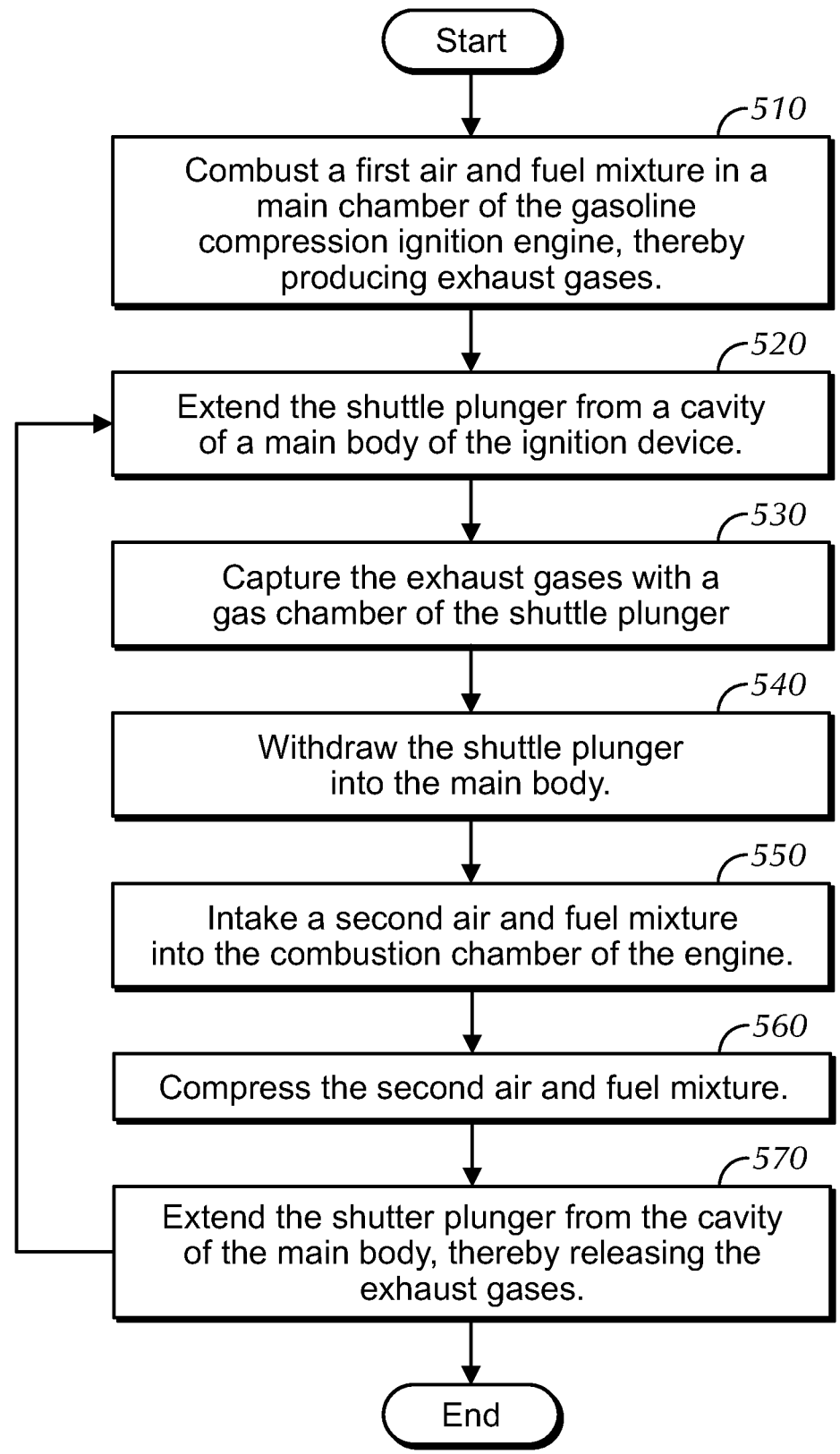
FIG. 5 shows a flowchart in accordance with one or more embodiments.

FIG. 5 depicts a flowchart showing a method of operating a GCI engine 1 that has an ignition device 3 according to one embodiment of the invention. The method depicted in FIG. 5 is described as a compression combustion reaction for descriptive purposes, however a person of ordinary skill in the art would appreciate that the method described is applicable to other operation methods without deviating from the spirit of the invention.

In block 510, a first air and fuel mixture is combusted in a main chamber of the GCI engine 1 during the combustion phase of either a compression ignition process or spark ignition process. In either process, the combustion reaction ignites fuel and air dispersed throughout the combustion chamber 13, which expands throughout the combustion chamber 13 and actuates the piston 15 to BDC. Following the actuation of the piston 15, the combustion chamber 13 is filled with exhaust gases from the combustion of the first air and fuel mixture and the exhaust phase begins.

In block 520, the shuttle plunger 21 is extended from the cavity 19 of the main body 17 of the ignition device 3 at the end of the power phase and the beginning of the exhaust phase in order to capture the exhaust gases from the combustion of the first air and fuel mixture. More specifically, in block 520, the electromagnetic coil 33 is energized, creating an electromagnetic field that surrounds the electromagnetic sleeve 45 of the shuttle plunger 21 to form a solenoid which actuates the shuttle plunger 21. Due to the magnetic repulsion of the electromagnetic sleeve 45 from the electromagnetic field, the shuttle plunger 21 extends from the main body 17, allowing the orifice 39 of the gas chamber 37 to be exposed to the combustion chamber 13.

In block 530, the exposition of the orifice of the gas chamber 37 to the combustion chamber 13 allows the exhaust gases created in block 510 to freely flow into the gas chamber 37 during the exhaust phase. This process may happen without the aid of the piston 15 due to the natural diffusion of the exhaust gases into the gas chamber 37, or it may happen during the exhaust stroke of the engine cycle, in which case the exhaust gases are forced into the gas chamber 37 by the movement of the piston 15.

In block 540, the shuttle plunger 21 is withdrawn into the main body 17 at the end of the exhaust phase and the beginning of the intake phase. Due to the outer surface of the shuttle plunger 21 being flush with the main body 17, the orifice 39 of the gas chamber 37 is covered by the main body 17 and the exhaust gases are trapped in the gas chamber 37. In order to prevent the exhaust gases from escaping the gas chamber 37 and the main body 17, the ignition device 3 may have a gasket or O-ring disposed between the shuttle plunger 21 and main body 17. Alternatively, the cap 43 of the ignition device 3 may have a gasket that seals the main body 17 and does not allow the exhaust gases to escape the ignition device 3.

In block 550, air is brought into the combustion chamber 13 through an intake manifold 5 of the engine 1 during an intake phase. At this point, the piston 15 travels from TDC to BDC, which creates a vacuum that pulls air into the combustion chamber 13. If the engine 1 is being operated in a spark-ignited mode, fuel is injected into the combustion chamber 13 from a fuel injector 7 during the intake cycle.

In block 560, the piston 15 compresses the air drawn into the combustion chamber 13 during the compression phase. Near the end of the compression phase, fuel is injected into the compressed air through a fuel injector 7, thereby creating a second air and fuel mixture. Alternatively, the fuel and air are mixed prior to entering the combustion chamber 13.

In block 570, in order to raise the temperature of the compressed second air and fuel mixture created in block 560, the shuttle plunger 21 is extended from the main body 17. Specifically, the electromagnetic coil 33 is energized, creating an electromagnetic field that acts upon the electromagnetic sleeve 45 of the shuttle plunger 21. This extension exposes the orifice 39 of the gas chamber 37 to the combustion chamber 13 of the engine 1. At this point, the hot exhaust gases are returned to the combustion chamber 13, which raises the temperature of the second air and fuel mixture, causing the mixture to ignite and combust. At this point the cycle restarts at block 520 by capturing the newly created exhaust gases within the gas chamber 37 of the ignition device 3.

While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively. By way of example, the combustion of the first air and fuel mixture may occur as a result of the auto-ignition, and the exhaust gases may be captured without the need for a spark. Alternatively, the ignition device 3 may remain fully extended throughout the combustion process in order to operate the engine 1 in a purely spark-ignited mode of operation, or the ignition device 3 may operate without the use of the center electrode 29 and solely capture exhaust gases from the combustion chamber 13.

As discussed above, GCI engines operate by compressing air and fuel to raise the temperature in a combustion chamber of an engine to automatically ignite an air and fuel mixture. Accordingly, an ignition device as described above advantageously allows for the air and fuel mixture to be warmed prior to ignition, which aids in efficiency and allows the engine to operate during a cold-start period prior to the engine reaching the requisite temperature for self-ignition of the air and fuel mixture. The ignition device further allows the engine to be operated in a spark-ignition mode in cold-start conditions without the aid of additional devices. The gas chamber may also be used as a precombustion chamber for the engine. In this case, a shuttle plunger of the ignition device extends from the main body during a compression phase of the engine cycle and is withdrawn into the main body while holding the air and fuel mixture prior to combustion occurring. A center electrode ignites the air and fuel mixture, and the shuttle plunger extends from the main body of the ignition device to release a jet of flame into the combustion chamber that ignites a compressed fuel and air mixture.

While the disclosure has been described with respect to a limited number of embodiments, those skilled in the art, having benefit of this disclosure, will appreciate that other embodiments may be devised which do not depart from the scope of the disclosure as disclosed herein. Accordingly, the scope of the disclosure should be limited only by the attached claims.

What is claimed is:

1. An ignition device for a gasoline compression ignition engine, the ignition device comprising:
    a shuttle plunger comprising a gas chamber, wherein the gas chamber is delimited by at least one sidewall of the shuttle plunger and is configured to capture exhaust gases;
    an electromagnetic coil configured to actuate the shuttle plunger in a first direction;
    a main body comprising a cavity containing the shuttle plunger and the electromagnetic coil; and
    a center electrode, fixed to the shuttle plunger, configured to ignite a fuel mixture,
    wherein the shuttle plunger comprises an upper section, a middle section, and a lower section that surround the center electrode.

2. The ignition device of claim 1, wherein the ignition device is attached to a cylinder head of the gasoline compression ignition engine.

3. The ignition device of claim 1, wherein in a first position, the shuttle plunger is contained inside of the cavity of the main body.

4. The ignition device of claim 3, wherein in a second position, the shuttle plunger extends from the main body.

5. The ignition device of claim 1, further comprising a cap configured to form a stop for the shuttle plunger.

6. The ignition device of claim 1, further comprising a return spring configured to actuate the shuttle plunger in a second direction, the second direction being opposite to the first direction.

7. The ignition device of claim 6, wherein the return spring surrounds the shuttle plunger.

8. The ignition device of claim 1, wherein an outer surface of the shuttle plunger is flush with an inner surface of the main body.

9. The ignition device of claim 1, wherein the center electrode is encased in a dielectric material.

10. The ignition device of claim 1, wherein the shuttle plunger is encased in an electromagnetic sleeve.

11. The ignition device of claim 1, wherein the electromagnetic coil surrounds the shuttle plunger.

12. The ignition device of claim 1, further comprising an electromagnetic coil connector body that extends from the cavity of the main body to an external surface of the main body.

13. The ignition device of claim 1, wherein an inner surface of the main body is an oil impregnated material.

14. The ignition device of claim 1, wherein the middle section has a larger cross section than the upper section and the lower section.

15. The ignition device of claim 1, wherein the main body has a threaded end that is received in a cylinder head of the gasoline compression ignition engine.

16. A method of operating a gasoline compression ignition engine, the method comprising:
    combusting, by a center electrode fixed to a shuttle plunger of an ignition device, a first air and fuel mixture in a main chamber of the gasoline compression ignition engine, thereby producing exhaust gases;

extending, by an electromagnetic coil, the shuttle plunger from a cavity of a main body of the ignition device that contains the shuttle plunger;

capturing the exhaust gases by a gas chamber of the shuttle plunger, wherein the gas chamber is delimited by at least one sidewall of the shuttle plunger;

withdrawing the shuttle plunger into the main body, thereby sealing the gas chamber, intaking a second air and fuel mixture into the main chamber of the gasoline compression ignition engine;

compressing the second air and fuel mixture; and extending, by the electromagnetic coil, the shuttle plunger from the cavity of the main body, thereby releasing the exhaust gases from the gas chamber, wherein the shuttle plunger comprises an upper section, a middle section, and a lower section that surround the center electrode.

17. The method of claim 16, wherein extending the shuttle plunger from the cavity of the main body of the ignition device comprises creating an electromagnetic field that surrounds the shuttle plunger.

18. The method of claim 16, wherein withdrawing the shuttle plunger into the main body further comprises applying a force to the shuttle plunger via a return spring.

19. The method of claim 16, further comprising threading the main body into a cylinder head of the gasoline compression ignition engine.

* * * * *